(12) United States Patent
Heywood et al.

(10) Patent No.: US 8,216,620 B2
(45) Date of Patent: *Jul. 10, 2012

(54) DUAL-TEXTURED FOOD SUBSTRATE HAVING LARGE SEASONING BITS

(75) Inventors: Adrianna Ashley Heywood, Plano, TX (US); K. Michael King, Dallas, TX (US); Richard Todd Smith, McKinney, TX (US); Heather Ann Longo, Richardson, TX (US)

(73) Assignee: Frito-Lay North America, Inc., Plano, TX (US)

( * ) Notice: Subject to any disclaimer, the term of this patent is extended or adjusted under 35 U.S.C. 154(b) by 1840 days.

This patent is subject to a terminal disclaimer.

(21) Appl. No.: 11/327,600

(22) Filed: Jan. 6, 2006

(65) Prior Publication Data

US 2006/0115561 A1 Jun. 1, 2006

Related U.S. Application Data

(60) Division of application No. 10/755,577, filed on Jan. 12, 2004, now Pat. No. 7,074,446, which is a continuation-in-part of application No. 10/696,970, filed on Oct. 30, 2003, now Pat. No. 7,074,445.

(51) Int. Cl.
A23P 1/08 (2006.01)
(52) U.S. Cl. ............... 426/94; 426/96; 426/808
(58) Field of Classification Search .................. 426/94, 426/96, 808
See application file for complete search history.

(56) References Cited

U.S. PATENT DOCUMENTS

| | | | |
|---|---|---|---|
| 3,656,966 A * | 4/1972 | Ball et al. .................. 426/94 |
| 3,689,290 A | 9/1972 | Blackstock et al. | |
| 3,998,978 A | 12/1976 | Lawrence et al. | |
| 4,260,637 A | 4/1981 | Rispoli et al. | |
| 4,401,681 A | 8/1983 | Dahle | |
| 4,500,553 A | 2/1985 | Liggett et al. | |
| 4,585,657 A | 4/1986 | Karwowski et al. | |
| 4,663,175 A | 5/1987 | Werner et al. | |
| 4,670,272 A | 6/1987 | Chen et al. | |
| 4,717,570 A | 1/1988 | Polizzano | |
| 4,738,865 A | 4/1988 | Morris | |
| 4,744,994 A | 5/1988 | Bernacchi et al. | |
| 4,748,031 A | 5/1988 | Koppa | |
| 4,755,390 A | 7/1988 | Calandro et al. | |
| 4,840,803 A | 6/1989 | Polizzano | |
| 4,847,098 A | 7/1989 | Langler | |
| 4,853,236 A | 8/1989 | Langler | |
| 4,910,028 A | 3/1990 | Bernacchi et al. | |
| 4,910,031 A | 3/1990 | Budd et al. | |
| 4,913,919 A | 4/1990 | Cornwell et al. | |
| 4,919,953 A * | 4/1990 | Palmlin et al. ............ 426/273 |
| 4,943,438 A | 7/1990 | Rosenthal | |
| 4,961,942 A | 10/1990 | Cocco et al. | |
| 4,961,943 A | 10/1990 | Blanthorn et al. | |
| 5,080,919 A | 1/1992 | Finley et al. | |
| 5,098,723 A | 3/1992 | DuBois et al. | |
| 5,146,844 A | 9/1992 | Dubowik et al. | |
| 5,188,855 A | 2/1993 | Bernacchi et al. | |
| 5,208,059 A | 5/1993 | Dubowik et al. | |
| 5,298,268 A * | 3/1994 | Maegli .................... 426/93 |
| 5,405,625 A | 4/1995 | Biggs | |
| 5,429,834 A * | 7/1995 | Addesso et al. .......... 426/549 |
| 5,433,961 A | 7/1995 | Lanner et al. | |
| 5,500,240 A * | 3/1996 | Addesso et al. .......... 426/560 |
| 5,514,399 A | 5/1996 | Cordera et al. | |
| 5,520,942 A | 5/1996 | Sauer et al. | |
| 5,523,106 A | 6/1996 | Gimmler et al. | |
| 5,532,010 A | 7/1996 | Spanier et al. | |
| 5,554,681 A | 9/1996 | Patel | |
| 5,595,774 A | 1/1997 | Leibfred et al. | |
| 5,650,184 A | 7/1997 | Humphry et al. | |
| 5,652,010 A | 7/1997 | Gimmler et al. | |
| 5,698,252 A | 12/1997 | Kelly et al. | |
| 5,707,448 A | 1/1998 | Cordera et al. | |
| 5,723,164 A | 3/1998 | Morano | |
| 5,741,505 A | 4/1998 | Beyer et al. | |
| 5,770,248 A | 6/1998 | Leibfred et al. | |
| 5,786,008 A | 7/1998 | Humphry et al. | |
| 5,827,553 A * | 10/1998 | Dimitroglou et al. ........ 426/89 |
| 5,846,587 A | 12/1998 | Kelly et al. | |
| 5,935,634 A | 8/1999 | Gamay et al. | |
| 5,964,146 A | 10/1999 | Kelly et al. | |
| 6,001,409 A * | 12/1999 | Gimmler et al. .......... 426/549 |
| 6,117,477 A | 9/2000 | Paluch | |

(Continued)

FOREIGN PATENT DOCUMENTS

EP 0299755 * 7/1988

(Continued)

OTHER PUBLICATIONS

Matz, S. 1976. Snack Food Technology. The AVI Publishing Company, Inc., Westport, CT. p. 29, 35-39.*

(Continued)

*Primary Examiner* — Carolyn Paden
(74) *Attorney, Agent, or Firm* — Colin P. Cahoon; Amanda K. Jenkins; Carstens & Cahoon, LLP

(57) ABSTRACT

A dual-textured food substrate having large seasoning bits whereby the bits are substantially adhered to the food substrate, or chip with a dry adhesive. The food substrate has a non-particulate second topping that is softer than the food substrate. The underlying cooked food substrate is substantially flat. The food ingredient properties are optimized to provide a shelf-stable dual-textured food product.

24 Claims, 1 Drawing Sheet

U.S. PATENT DOCUMENTS

| | | |
|---|---|---|
| 6,270,817 B1 | 8/2001 | Barnes et al. |
| 6,274,189 B1 | 8/2001 | Kazemzadeh |
| 6,299,916 B1 | 10/2001 | Daily |
| 6,312,746 B2 | 11/2001 | Paluch |
| 6,352,732 B2 | 3/2002 | Lanner et al. |
| 6,500,474 B2 | 12/2002 | Cross et al. |
| 6,534,102 B2 | 3/2003 | Kazemzadeh |
| 7,074,445 B2 * | 7/2006 | Barber et al. ............... 426/292 |
| 7,074,446 B2 * | 7/2006 | Heywood et al. ............ 426/292 |
| 2002/0187220 A1 | 12/2002 | Luhadiya |
| 2003/0017240 A1 | 1/2003 | Burke et al. |
| 2003/0044488 A1 * | 3/2003 | Roskam et al. ............... 426/94 |
| 2004/0121051 A1 * | 6/2004 | Fenn et al. ................... 426/132 |

FOREIGN PATENT DOCUMENTS

| | | |
|---|---|---|
| EP | 0815741 A2 | 7/1998 |

OTHER PUBLICATIONS

Peterson, M. S. 19778. Encyclopedia of Food Science. The AVI Publishing Company, Inc., Westport, CT. p. 852-860.*

* cited by examiner

DUAL-TEXTURED FOOD SUBSTRATE HAVING LARGE SEASONING BITS

CROSS-REFERENCE TO RELATED APPLICATION

This application is a divisional of U.S. application Ser. No. 10/755,577, now U.S. Pat. No. 7,074,446, entitled "Method for Making a Dual-Textured Food Substrate Having Large Seasoning Bits" filed on Jan. 12, 2004, which is a continuation-in-part of U.S. application Ser. No. 10/696,970, now U.S. Pat. No. 7,074,445, filed on Oct. 30, 2003, the technical disclosures of which are hereby incorporated by reference.

BACKGROUND OF THE INVENTION

1. Technical Field

The present invention relates to a food substrate having three-dimensional bits, fragments, chunks, or morsels and more particularly, to a snack food substrate having large three dimensional food bits whereby the large bits are substantially adhered to the substrate. More specifically, the present invention relates to a dual-textured, topped snack food.

2. Description of Related Art

Food particulates are often added to foods, especially snack foods. Tortilla chips, pretzels, crackers, popcorn, and numerous other foodstuffs often have seasonings applied to them during processing. Seasonings used, usually in a powdered form, have included salt, cheese, chili, garlic, Cajun spice, ranch, sour cream and onion, among many others. However, there is often an undesirable accumulation of seasoning on the sidewalls and bottom of the snack food bag with the result that the consumer has less than the desired complement of topping thereon. The separation occurs because of insufficient adhesion of the seasoning to the chip. The problem of separation increases with the size and weight of the individual particles.

One way this problem has been approached in the past was by using oil as an adhesive to adhere particulate seasonings to a base or substrate. For example U.S. Pat. No. 6,534,102 B2, issued to Kazemzadeh, discloses a seasoning bit that, following extrusion and cooking is immersed into an oil and seasoning slurry at an elevated temperature. The product is then dry-coated with seasonings or sprayed with hot or room temperature oils and fats either carrying seasonings or the seasonings are applied as dusting on the surface while the oil and fats are used to adhere the seasoning to the surface. One drawback to using only oil, however, is that the adhesive strength of traditional oil mixes are not strong enough to adhere large three-dimensional bits to a substrate surface. In certain applications, large three-dimensional bits are desirable because they enable packaged snack chips to emulate another topped product including, but not limited to a pizza with toppings, a nacho chip, or a tostada.

Another prior art composition used to adhere particulate to a food product is U.S. Pat. No. 3,689,290 issued to Blackenstock et al which discloses using a coating agent comprised of dry corn syrup solids to adhere small particle sizes of food toppings to a substrate. The Blackenstock Patent discloses a particle size of the food topping as being 12-100 mesh, which corresponds to a particle size range of 0.150 to 1.68 millimeters (0.0059 to 0.0661 inches). Again, these are relatively small particle sizes that are being adhered to a substrate. The adhesive is not strong enough to adhere a substantial amount of larger three-dimensional particles to the chip.

U.S. Patent Application 2002/0187220 A1 discloses an edible particulate adhesive comprising maltodextrin, an edible surfactant, a solvent, a polysaccharide, and a modified starch. The invention, however, is clearly aimed at very small particulate adhesion. The invention indicates the preferred particle size is less than 650 micrometers. Thus, this invention also fails to adhere relatively large bits to a chip.

Another prior art composition used to adhere flavorings to a foodstuff is illustrated by European Patent EP 0 815 741 A2 which discloses a hot melt composition comprising a starch, such as corn syrup, maltodextrin, or an amylase-treated starch, and a plasticizer, such as a polyol or a polyacetic acid. Like the other inventions, this invention was also designed to adhere powdery-type particulate additives to foodstuffs such as salt, sugar, cheese powder, and ranch seasonings. Like other inventions in the prior art, it also fails to adhere relatively large bits to chips.

Another prior art approach to adhere large food flavorings and spices was to put the flavorings on an unbaked cracker. Thus, cheese flavorings and other spices were then baked into the dough. This approach, however, cannot be used when it is desirable to adhere particles to a substantially cooked snack piece, such as a tortilla chip, immediately prior to the addition of seasoning.

Consequently a need exists for a method to adhere large particulate flavoring bits, fragments, chunks, or morsels to a food substrate. The method should allow a snack food to demonstrate the characteristic look, texture, and taste of an emulated topped food product, yet be highly resistant to separation. The method should be adaptable to a product line wherein the addition of the large particles occurs at a step after substantial cooking of the underlying food substrate.

Food ingredients are typically enclosed in a hermetically sealed food package and thus approach equilibrium with the relative humidity of the inside of the package. It has proven difficult to achieve a dual-textured or multi-textured snack food, because the food ingredient having a lower moisture content and thereby crispy texture, typically absorbs evaporated moisture from a food ingredient having a higher moisture content and thereby softer texture.

As the lower moisture content food ingredient absorbs water it becomes less crispy. As the higher moisture content food ingredient loses water, it hardens. Because of this moisture migration it is difficult to achieve a long shelf-life on dual textured snack products.

The water content of a food ingredient is typically measured by its water activity level ("Aw"). The Aw is defined by the following equation:

$$Aw = P/Po$$

where P=vapor pressure of water in the food
Po=vapor pressure of pure water under the same conditions.

The Aw is a quantitative measure of unbound free water in a system that is available to support biological and chemical reactions. Two different food ingredients with the same water content can vary significantly in their Aw level depending on how much free water is in the system. If a higher moisture content, soft texture ingredient has an Aw that exceeds the relative humidity of its environment, then water tends to evaporate from the food ingredient causing the ingredient to harden. Similarly, if a lower moisture content, crispy texture has an Aw that is less than the relative humidity of its environment, then it tends to absorb water, causing the ingredient to soften. For example, consider a piece of soft cheese, having an Aw of 0.92 placed on a crispy cracker having an Aw of 0.10 in a sealed container initially at 50% relative humidity. Over time the texture of the soft cheese hardens as it loses water and approaches equilibrium with the container atmosphere. The texture of the crispy cracker, however, softens as it absorbs this evaporated moisture to approach equilibrium with the container atmosphere. As a result, both food ingredients lose their desired texture. Moreover, besides texture changes, changes in moisture can lead to other undesirable effects including microbial growth, degradation reactions, and organoleptical changes.

The problem is compounded in multi-textured, topped food products that require an adhesive. Water-based adhesive systems utilized on a food substrate negatively impact texture as hydration and subsequent thermal drying destroy internal structures. Moreover, a water-based adhesive deteriorates chip crispness, especially if applied in an aqueous state, because of moisture migration from the adhesive into the food substrate. In addition, there is flavor loss that results from drying a moistened food substrate. As discussed previously, oil-based adhesives fail to adhere large bit particulate flavoring bits to a food substrate. As a result, it has long been difficult for food product manufacturers to package multi-textured food products for extended shelf life storage. Numerous attempts to preserve dual-textured features of food products are illustrated in the prior art.

U.S. Pat. No. 4,401,681 discloses a method for preventing moisture migration from a high-moisture phase to a low-moisture phase. For example, the patent discloses combining corn syrup solids having a Dextrose Equivalent of 22 to 24 and a high methoxyl pectin with a pizza sauce to prevent moisture from the sauce from migrating into the pizza crust during shelf life. This disclosure, however fails to teach a method that minimizes moisture transmission from a softer texture to a crisper texture through an area having a headspace. Rather the disclosure is limited to providing a direct barrier layer between two ingredients with high differential moisture contents.

U.S. Pat. No. 4,853,236 discloses a shelf-stable dual-textured food product having a first, hard texture comprising a fruit composition on a shell portion, and a second, variably textured core portion comprising an oil-in-water emulsion. This disclosure fails to teach both an outer chewy and an outer crispy texture of a topped food product.

U.S. Pat. No. 4,961,942, discloses a dough composition having a plurality of shelf-stable textures. The patent further discloses a soft, chewy filler cookie dough and a firmer outer casing dough wherein the casing dough comprises a high sugar content. It fails to disclose a dough that can be used in savory snacks.

U.S. Pat. No. 4,913,919, assigned to the same assignee of the present application, discloses a coating composition comprising a high solids content aqueous suspension, having a solids content of at least 40% by weight. The outside surface of a snack food is coated with the aqueous solution. The coating is dried to provide a crisp outer texture and chewy inner texture. This disclosure fails to teach an outer chewy texture.

U.S. Pat. No. 5,405,625, discloses a cheese filled snack product having a crisp outer casing comprising potato flakes and pre-gelatinized rice flour. In one embodiment, the filling is moist and the snack food product can be baked or microwaved without the cheese filling over expanding or leaking. This disclosure fails to teach an outer chewy texture.

U.S. Pat. No. 6,500,474 discloses using a heated liquid coating to further coat a pre-coated food product and subsequently contacting the liquid-coated pre-coated food piece with a chunky particulate matter to form a food product enrobed with a substantially continuous chunky coating. This disclosure fails to teach an outer crispy texture.

Accordingly, a need exists for a method for making a shelf-stable dual-textured, topped snack food product comprising a crisp food substrate and a chewy topping. The method should utilize a non-water based and non-oil based adhesive that can adhere large particulate flavoring bits to a substantially cooked, crisp food substrate. The method should minimize the water activity in food product ingredients and should minimize moisture migration from the chewy topping to the crisp food substrate.

SUMMARY OF THE INVENTION

The proposed invention uses a combination of dry-powdered adhesives admixed onto bits and placed on a food substrate and wherein further the adhesive undergoes a glass transition and flows down around the bit to the bit and food substrate contact point. Subsequently, process conditions change, and the adhesive undergoes another glass transition back to an amorphous solid which hardens the adhesive and adheres the bit to the food substrate surface.

Hence, this invention produces a method whereby large flavoring bits are adhered to a snack food substrate to achieve the look, texture, and taste of an emulated topped food product. In addition, the instant method provides a topping that is highly resistant to separation. Furthermore, the method can be implemented following the cooking of the underlying food substrate.

The invention further provides a method that minimizes moisture migration from a softer textured topping to a crispier food substrate. Food product ingredient properties are optimized to provide at least two distinct textures. Optimized food product ingredient properties can be moisture content, water activities, and sorption slopes.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
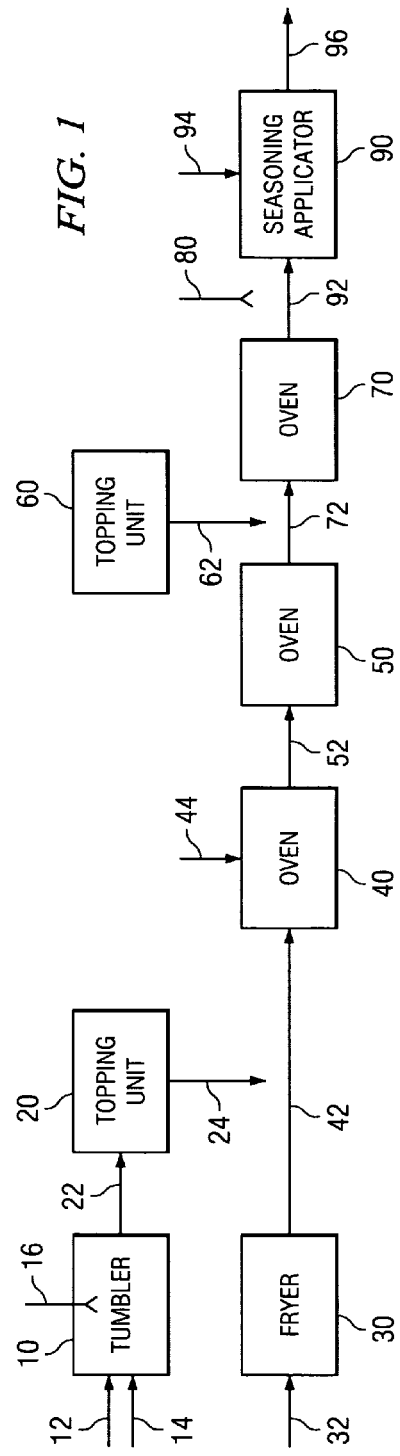
FIG. 1 is a schematic representation of one embodiment of the new process.

An embodiment of the innovative invention will now be described with reference to FIG. 1. Seasoning, flavoring or illustrative bits 12 and an adhesive 14 are mixed together in a 30-inch diameter mixer or tumbler 10. As used herein, large seasoning bits 12 are food grade seasonings wherein at least 5% of the bits, by weight, have a diameter exceeding 1.7 millimeters and are substantially between 1.7 and 17.0 millimeters diameter. In a preferred embodiment, vegetable oil 16, preferably at a temperature of about 23 to 32° C. (74 to 90° F.), is sprayed into the tumbler 10 to coat the seasoning bits 12 to function as a temporary liquid adhesive 16 and promote bonding between the dry adhesive 14 and the seasoning bits 12. In an alternative embodiment, the temporary liquid adhesive 16 is heated to a temperature of about 43 to 60° C. (109 to 140° F.) prior to being sprayed in the tumbler 10. The temporary adhesive 16 used can be any prior art adhesive oil including, but not limited to, olestra®, corn oil, soybean oil, cottonseed oil, or palm oil. Alternatively, an oil substitute can be used as a temporary liquid adhesive 16. The objective is to coat the seasoning bits 12 to promote bonding with the dry adhesive 14 during mixing and until the dry adhesive 14 undergoes a glass transition phase. Any temporary liquid adhesive 16 that meets this objective can be used. Examples of an oil substitute that could be used as a temporary adhesive includes, but is not limited to glycerol, propylene glycol, alcohol, and mixtures thereof. A temporary liquid adhesive 16 may not be needed if the particle size of the dry adhesive 14 is small enough, and/or the individual bits 12 are porous enough, and/or the bit has a moist hydroscopic or oily exterior.

The tumbler 10 is a cylindrical device that rotates and is typically used to add seasoning to a substrate's total circumference. In this invention, however, the tumbler is used to admix adhesive 14 to the seasoning bit 12. Thus, although a tumbler 10 is described in this embodiment, any equivalent device including but not limited to, a mixer, a tumbler including a batch tumbler or a continuous tumbler, or a blender such as a batch blender, continuous blender, or ribbon blender may be used to admix the adhesive 14 to the seasoning bit. As used in this invention, a substrate is substantially cooked and can be a fried or baked snack food chip made from a dough, such as masa or other starch based dough. As used in this invention the terms substrate and chip are used interchangeably and refer to any wide variety of snack food items that are commonly commercially available including, but not limited to, potato chips, crackers, multigrain chips, corn chips, and tortilla chips. In one embodiment of the present invention, the substrate comprises a first texture that is crispy.

Seasoning bits 12 comprising Textured Vegetable Protein, flavored vegetable bits, or colored bits are commercially available. For example, Bac'n Pieces™ Bacon Flavored Bits can be purchased from McCormick® of Sparks, Md. in many local grocery stores. The bits can also comprise corn flour or wheat flour, independently or in combination. Hence, the bits can consist of textured vegetable protein, corn flour, wheat flour, and combinations thereof. In one embodiment, the bits have a moisture content preferably less than about 5%.

Following admixing in the tumbler 10, the seasoning bits 12 and adhesive 14 are then transferred 22 to a first topping unit 20. A topping unit 20 manufactured by Raque, of Louisville, Ky. can be used. Corn Syrup Solids are defined by the FDA as dried glucose syrups in which the reducing sugar content is 20 Dextrose Equivalent or higher. In one embodiment, the dry adhesive 14 used preferably comprises corn syrup solids with a Dextrose Equivalent more than 20 and most preferably between about 20 and 50. This Dextrose Equivalent range can result in reduced chewiness, shininess, and sweetness. Dextrose Equivalents higher than about 50 can be used, but result in a sweeter, as opposed to savory flavor. Numerous other carbohydrate adhesives can also be used including, but not limited to dextrose, dextrin, maltodextrose, sucrose, polydextrose, and combinations thereof. These carbohydrates can be purchased from various suppliers including National Starch and Chemical Company of Bridgewater, N.J., Danisco Cultor of New Century, Kans., and Tate & Lyle PLC located in London, England. In an alternative embodiment, maltodextrin, defined by the FDA as dried glucose syrups in which the reducing sugar content is less than 20 Dextrose Equivalent can be used. Use of maltodextrin, however, can require the use of steam to activate the adhesive. By using corn syrup solids instead of a water-based or steam requiring adhesive, a crisp chip texture is preserved because hydration and subsequent thermal drying is greatly reduced. Thus, use of corn syrup solids or other acceptable carbohydrate results in a preferable dry adhesive application.

Again, although this invention is described with reference to a fried tortilla chip, any food substrate including, but not limited to, a chip, a cracker, a baked chip, an extruded snack, or a puffed snack, can be used. Prior to the chip entering the fryer 30, the dough is made by any one of a number of standard methods well known in the art. A novel and unique combination of modifications, however, can be made to the prior art dough and/or the dough ingredients to enhance the crispiness of the underlying topped substrate. For example, in a tortilla chip embodiment, a coarser corn grind, preferably made from the corn mill having a gap between about 0.0020 and about 0.0030 millimeters, and more preferably having a gap between about 0.0023 and about 0.0026 millimeters can be used. A coarser grind requires less shear when corn is ground into masa, decreasing the amount of starch gelatinization and increasing the amount of larger ground corn particles in the masa. Larger particles cause the chip texture to remain more coarse which conveys a heartier, crunchier, and crispier chip. Less gelatinization provides thinner surface film formation during frying. In addition, larger ground corn particle sizes cause more disruptions, even more so in a thinner surface film. When the dough is fried, water within the dough can more easily escape through these disruptions as steam, resulting in a chip with a lower moisture content. A lower moisture content chip results in a crispier texture. Further, the product will contain less steam build-up within the chip during flying, which in turn reduces the amount and size of surface blisters produced, further resulting in a crispier texture. Starch, preferably between about 2% and about 10% by weight of the dough, can be added to the dough to absorb more water during masa production. In one embodiment, waxy corn starch is used. Again, when this water is subsequently released during flying, smaller and more numerous surface blisters are created resulting in a crisper texture. A low gluten flour, preferably between about 2% and about 35% by weight of the dough, can be used in the dough for organoleptic properties. In one embodiment, wheat flour is used.

Typically, a dough product is compressed between a pair of counter rotating sheeter rollers that are located closely together, thereby providing a pinch point through which the dough is formed into sheets. The dough can then be cut by, for example, a cutting roller to form the shape of the product desired. Alternatively, the dough or masa is extruded and cut into a desired chip shape. After the dough or masa is cut, the chips are transported towards and through a toast oven. The chips should be toasted to achieve a pre-cook moisture content between about 22% and about 30%. For this, the chips are deposited onto a moving belt. After toasting, the shaped chips have increased stiffness for insertion into a fryer 30. In one embodiment, the toasted chips, prior to being fried, are passed through a proofing stage where the chips are exposed to ambient air for a specified amount of time to equilibrate moisture. After proofing, chips are transferred to a fryer 30. To convey the chips into the fryer 30, the chips are removed from the toasting belt or conveyor and placed onto the fryer conveyer 32. Because flat substrate facilitates even application of the seasoning bits 12, in the preferred embodiment, a monolayer fryer 30 is utilized to help ensure a flat substrate and minimize chip curl. The monolayer fryer 30 has two belts; an upper belt and a lower belt. The substrate is positioned between the two belts as it moves through the fryer 30. The two-belt system minimizes chip curl and keeps the chip flat as it moves through the fryer. The chip, in the example of a tortilla chip, is in the monolayer fryer for a dwell time of about 52 to 56 seconds at a temperature of about 170-207° C.

(338-404° F.). A monolayer fryer also provides for more uniform frying and thus allows the chips to produce consistent blisters and a more uniform, lower exit moisture content. As used herein, an exit moisture content is the moisture content following the cooking of the food substrate. In one embodiment, the exit moisture content of a chip fried in a monolayer is preferably between about 0.5 and about 1.0%. Batch frying, on the other hand, results in variable moisture content, blister formation and finished oil contents. Moreover, prior art exit moisture contents typically exceed 1.0%. A lower exit moisture content results in a crispier chip. In addition, a drier, lower moisture content chip comprises more surface oil than interior oil. This surface oil helps to protect the chips from absorbing excess moisture during the topping process (discussed below). In an alternative embodiment, any fryer 30 known in the art can be used. After exiting the fryer 30, the substrate proceeds along an open mesh conveyer belt 42 and cools to approximately 100° F. to 150° F. Because this temperature is still above ambient, moisture migration onto the chip substrate is retarded. Although numerous modifications are disclosed to illustrate a preferred embodiment, the essence of the invention can be achieved with fewer than all of the dough ingredient and processing modifications disclosed, as those skilled in the art are likely to recognize. After the chip has been fried, the seasoning bits 12 and adhesive 14 are then applied 24 to the chip via a topping unit 20 or other topping means.

The chip is then sent to a first oven 40. An impingement oven such as model IMDJ-45AS-1, manufactured by Heat and Control, Inc., of Hayward, Calif. can be used as the first oven. The chip is transported through the first oven 40 on an open mesh conveyer belt for approximately 17 seconds. The elevated oven temperature, preferably about 190 to 232° C. (374 to 450° F.), serves to trigger the glass transition phase of the dry adhesive 14 onto the substrate. In one embodiment, steam 44 between 6.9 and 34.5 kPa (1 and 5 psi) is injected into the first oven 40 to expedite activation of the dry adhesive 14 by lowering the glass transition temperature of the adhesive via the addition of water vapor. In this embodiment, the chip then proceeds out of the first oven 40 along the open mesh conveyer belt 52 into a second oven 50 to drive off the moisture added in the first oven as steam. In the second oven 50, the chip proceeds on an open mesh conveyer belt for approximately 17 seconds at an elevated temperature range of about 190 to 232° C. (374 to 450° F.). The second oven 50 can be a make and model identical to the first oven 40.

In an alternative embodiment, only one oven, without steam, is used to trigger the glass transition phase of the dry adhesive. In such an embodiment, the oven temperature remains the same about 190 to 232° C. (374 to 450° F.). In addition, the total dwell time also remains the same at about 34 seconds. In alternative embodiments, longer or shorter dwell times and higher or lower temperatures could be used. The dwell time and temperature need only be sufficient to promote a glass transition change in the dry adhesive 14. An AirForce® impingement oven, manufactured by Heat & Control, Inc. of Hayward, Calif. can be used as in the single-oven embodiment. As used herein, an adhering means for adhering a seasoning bit to a substrate is meant to include any edible carbohydrate blend that undergoes a glass transition change at an adhesive (as opposed to oven) temperature between 40 and 60° C. when the adhesive has a moisture content of between about 4 to 8%. As those skilled in the art are aware, the glass transition temperature range of the dry adhesive 14 changes relative to the moisture content. The higher the moisture content, the lower the glass transition temperature range. Conversely, the lower the moisture content, the higher the glass transition temperature range. Thus, if the moisture content of the adhesive is raised above or below 4 to 8%, then the corresponding glass transition temperature range will change as well. However, such changes should be construed to be within the spirit and scope of the claimed invention.

The chip then proceeds out of the second oven 50 along the open mesh conveyer belt 72 where it begins to cool. In one embodiment, the chip cools for approximately 30 seconds. The dry adhesive 14 hardens on cooling to affect a strong bond between the seasoning bits 12 topping and the substrate.

In one embodiment, the steps of adding and heating the seasoning bits 12 above the glass transition temperature of the dry adhesive 14 and then allowing the seasoning bit 12, adhesive 14, and substrate to cool below the adhesive's 14 glass transition temperature could be repeated to form a multi-layered chip. By repeating these steps, two or more layers of seasoning bits 12 could be added to a single substrate or chip.

In a preferred embodiment of the invention, a second topping, preferably, but not necessarily, in the form of cheese shreds, a cheese-like topping, or a cheese topping is then applied to the bit-topped substrate via a second topping unit 60. Unlike the first topping comprising the bits, the second topping has a lower melting temperature than the seasoning bits 12 of the first topping and no additional adhesive is required to adhere the second topping to the substrate. In one embodiment, the second topping having a second texture comprises a softer texture than the first texture of the crispy substrate. A shelf-stable cheese analog as disclosed in U.S. patent application Ser. No. 10/649,825 and assigned to Kerry Specialty Ingredients of Beloit, Wis. can be used as the second topping.

Figure 2:
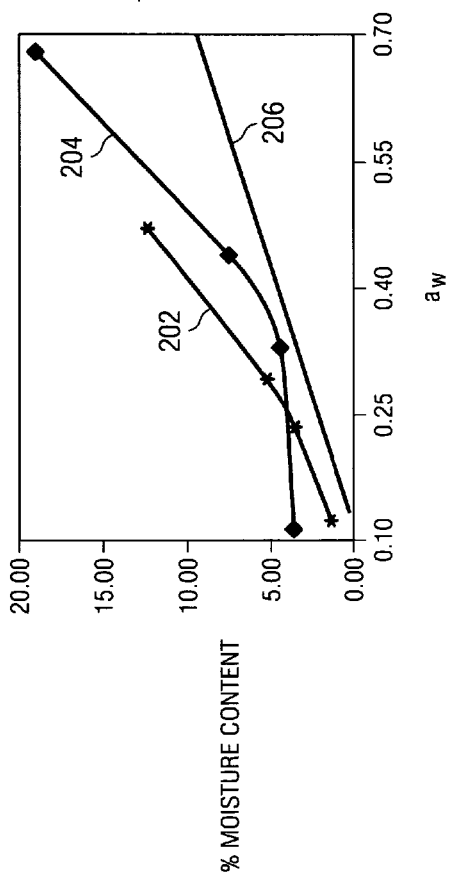
FIG. 2 is a graph representation depicting moisture sorption isotherms for the major ingredients in one embodiment of the invention.

FIG. 2 is a graph representation depicting the moisture sorption or desorption isotherms for the major ingredients in one embodiment of the invention. A moisture sorption isotherm is a graphical representation of the relationship between the moisture content of a food ingredient that absorbs moisture and the Aw of that food ingredient at a particular, constant temperature. The x-axis represents the Aw and the y-axis represents the moisture percentage of the main food components. An example of a chip moisture sorption isotherm 202 and adhesive sorption isotherm 204 is depicted in FIG. 2. A desorption isotherm is a graphical representation of the relationship between the moisture content of a food ingredient that loses moisture and the Aw of that food ingredient at a particular, constant temperature. A shelf-stable cheese analog moisture desorption isotherm 206 is depicted in FIG. 2. As used herein, sorption slope is defined as the slope of the sorption or desorption curve of a particular water activity value. The steeper the sorption slope, the higher the propensity to absorb water. Conversely, the more level the slope, the lower the propensity of a food ingredient to absorb water. Thus, it is advantageous for the chewy, softer texture food ingredients to comprise a steeper sorption slope than the crispy food ingredients to control moisture migration. For example, in one embodiment, the adhesive sorption slope 204 is steeper than the chip sorption slope 202. Because of the adhesive's steeper sorption slope 204, the adhesive helps buffer moisture uptake by the substrate. Hence, in one embodiment, the crispy chip substrate sorption slope 206 is always less steep than the cheese sorption slope 202 and often less steep than the adhesive sorption slope 204.

The second topping cheese analog comprises a fresh Aw between about 0.40 and about 0.50 and a heated Aw between about 0.30 and about 0.40 and comprises a desorption slope steeper than the sorption slope of the crispy base as illustrated by FIG. 2. A fresh Aw is the Aw of the cheese prior to the cheese being melted. The heated Aw is the Aw of the cheese after the cheese has been melted on the crispy substrate (discussed below). Moreover, at least one humectant can be used in the second topping to further inhibit moisture migration from the second, soft topping. A humectant is an ingredient that promotes the absorption and retention of moisture. Humetectants that can be used include, but are not limited to, glycerin, propylene glycol, sodium lactate and sodium acetate. In addition, other water binding systems such as cellulose can also be used in the second topping. The second topping can comprise at least one humectant between about 10 percent to about 40 percent, cellulose between about 1 percent to about 5 percent, or combinations thereof based on the weight of the second topping.

Referring back to FIG. 1, the second topping unit 60 can be the same model and type as first topping unit 20. Following application of the second topping, the chip is then routed to a third oven 70. The third oven 70 is preferably an infrared Raymax 1525, manufactured by Watlow Electric Manufacturing Company, of St. Louis, Mo. The chip is routed to a third oven 70 on an open mesh conveyer belt 72. The chip proceeds through the third oven 70 for a dwell time of approximately 60 seconds with an oven temperature about 82 to 138° C. (180 to 280° F.). In alternative embodiments, shorter or longer dwell times and higher or lower temperatures could be used. The dwell time and temperature need only be sufficient to melt the second set of toppings. The chip then proceeds out of the third oven 70 on an open mesh conveyer belt 92 where it is sprayed with an atomized oil or other liquid adhesive from both the top and the bottom. Unlike the temporary adhesive 16, the objective with this liquid adhesive is to provide a more permanent adhesive to bind a seasoning with the chip and the toppings. An oil spray applicator 80 manufactured by GOE-Avins of Amherst, N.Y., model #OSM-5000-BP-3065 can be used. Although many types of liquid adhesives including lard, other animal-based oils, and vegetable-based oils can be used as the atomized spray, a preferred embodiment uses corn or soybean oil. The liquid adhesive or oil should be sprayed at an elevated temperature, preferably about 43 to 60° C. (109 to 140° F.). Following oil atomization, the chip passes through a seasoning applicator 90 where a particulate flavored seasoning 94 is applied to both sides of the chip. The seasoning applicator 90 first applies seasoning 94 to the topside of the chip on an open mesh conveyer belt. The chip is then flipped onto another open mesh conveyer belt and the other side is then seasoned. A seasoning applicator manufactured by ARBO of Toronto, Ontario, Canada model number KDC-VV 12"×20"×45" can be used. The chip may then be further cooled and sent to be packaged 96.

While this invention has been particularly shown and described with reference to a preferred embodiment, it will be understood by those skilled in the art that various changes in form and detail may be made therein without departing from the spirit and scope of the invention.

What is claimed is:

1. A shelf-stable snack food product comprising:
   a cooked food substrate having a first texture wherein said food substrate further comprises a substantially flat geometry having a top side;
   a first topping on said food substrate comprising a mixture of a dry adhesive; and
   a plurality of three-dimensional seasoning bits wherein at least 5% of said bits, by weight, have a diameter substantially between about 1.7 and about 17 millimeters;
   a non-particulate second topping on said top side of said food substrate having a second texture wherein said second texture is softer than said first texture, wherein said non-particulate second topping comprises a fresh water activity between about 0.40 and about 0.50.

2. The shelf-stable snack food product of claim 1 wherein said cooked food substrate comprises a fried food substrate.

3. The shelf-stable snack food product of claim 2 wherein said fried food substrate is cooked in a monolayer fryer.

4. The shelf-stable snack food product of claim 1 further comprising a seasoning powder.

5. The shelf-stable snack food product of claim 1 wherein said cooked food substrate comprises a baked food substrate.

6. The shelf-stable snack food product of claim 1 wherein said second topping comprises a heated water activity between about 0.30 and about 0.40.

7. The shelf-stable snack food product of claim 1 wherein said second topping comprises between about 1 percent and about 5 percent cellulose.

8. The shelf-stable snack food product of claim 1 wherein said food substrate comprises a first sorption slope and wherein said second topping comprises a second sorption slope and wherein said second sorption slope is steeper than said first sorption slope.

9. The shelf-stable snack food product of claim 8 wherein said adhesive comprises a third sorption slope and wherein said third sorption slope is steeper than said first sorption slope.

10. The shelf-stable snack food product of claim 1 wherein said second topping comprises a shelf-stable cheese analog.

11. The shelf-stable snack food product of claim 1 wherein said dry adhesive further comprises a plurality of corn syrup solids having a Dextrose Equivalent between about 20 and about 50.

12. The shelf-stable snack food of claim 1 wherein said food substrate is made from a dough comprising a coarse grind wherein said coarse grind is made from a corn mill having a gap between about 0.0020 and about 0.0030 millimeter.

13. The shelf-stable snack food product of claim 1 wherein said snack food substrate is made from dough comprising an added starch between about 2 percent and about 10 percent by weight of the dough.

14. The shelf-stable snack food product of claim 13 wherein said starch comprises waxy corn starch.

15. The shelf-stable snack food product of claim 1 wherein said wherein said food substrate is made from a dough comprising a low gluten flour between about 2 percent and about 35 percent by weight of the dough.

16. The shelf-stable snack food product of claim 15 wherein said low gluten flour comprises wheat flour.

17. The shelf-stable snack food product of claim 1 wherein said bits comprise a pre-cook moisture content of between about 22 percent and about 30 percent by weight.

18. The shelf-stable snack food product of claim 1 wherein said bits comprise a moisture content of less than about 5% by weight.

19. The snack food product of claim 1 wherein an ingredient of said bits is selected from the group consisting of textured vegetable protein, corn flour, wheat flour, and mixtures thereof.

20. The shelf-stable snack food product of claim 1 wherein said seasoning bits have a third texture and wherein said second texture is softer than said third texture.

21. The snack food product of claim 1 wherein said food substrate comprises an exit moisture content between about 0.5 percent and about 1.0 percent.

22. The snack food product of claim 1 wherein said food substrate comprises a moisture content between about 0.5 percent and 2.0 percent.

23. A shelf-stable snack food product comprising:
a cooked food substrate having a first texture wherein said food substrate further comprises a substantially flat geometry;
a first topping on said food substrate comprising a mixture of a dry adhesive; and
a plurality of three-dimensional seasoning bits wherein at least 5% of said bits, by weight, have a diameter substantially between about 1.7 and about 17 millimeters;
a second topping on said top side of said food substrate having a second texture wherein said second texture is softer than said first texture, and wherein further said second topping comprises at least one humectant between about 10 percent and about 40 percent by weight of said second topping.

24. The shelf-stable snack food product of claim 23 wherein said humectant is selected form the group consisting of glycerin, propylene glycol, sodium lactate, sodium acetate, and mixtures thereof.

* * * * *